| United States Patent [19] | [11] Patent Number: 4,976,528 |
|---|---|
| Cuda | [45] Date of Patent: Dec. 11, 1990 |

[54] LASER MANIPULATOR

[76] Inventor: Joseph Cuda, 2937 Christopher Creek Rd. N., Jacksonville, Fla. 32217

[21] Appl. No.: 311,860

[22] Filed: Feb. 17, 1989

[51] Int. Cl.$^5$ .............................................. G02B 7/18
[52] U.S. Cl. ..................................... 350/635; 350/632
[58] Field of Search ............... 350/631, 632, 635, 636, 350/639; 248/476, 481, 487

[56] References Cited

U.S. PATENT DOCUMENTS

| | | |
|---|---|---|
| 1,829,037 | 10/1931 | Bobroff . |
| 3,459,470 | 8/1969 | Hahn . |
| 3,642,353 | 2/1972 | Field ..................... 248/481 |
| 4,218,037 | 8/1980 | Palamountain . |
| 4,469,406 | 9/1984 | Mittelhauser . |
| 4,494,540 | 1/1985 | Erb . |
| 4,527,447 | 7/1985 | Taylor . |
| 4,648,692 | 3/1987 | Windshita ..................... 350/636 |
| 4,660,944 | 4/1987 | Suzuki et al. . |
| 4,686,992 | 8/1987 | Dewey et al. . |
| 4,721,274 | 1/1988 | Erb . |
| 4,798,452 | 1/1989 | Erb ..................... 350/639 |
| 4,863,243 | 9/1989 | Wakefield ..................... 350/636 |
| 4,887,894 | 12/1989 | Gluzerman et al. ................. 350/632 |
| 4,930,883 | 6/1990 | Salzman ..................... 350/632 |

FOREIGN PATENT DOCUMENTS 3416656 11/1985 Fed. Rep. of Germany .

Primary Examiner—Bruce Y. Arnold
Assistant Examiner—J. P. Ryan
Attorney, Agent, or Firm—Banner, Birch, McKie & Beckett

[57] ABSTRACT

An apparatus for directionally controlling transmission of a laser beam or the like to a target area. The apparatus includes a support body, which supports a specular element, and a tubular receiving member having a mounting surface for receiving the support body. The support body, tubular receiving member and a mounting mechanism therebetween form a mirror module. The mounting mechanism is disposed within the receiving member for releasably coupling the support body to the tubular receiving member and frictionally maintaining the support body seated against the mounting surface in a first position, while permitting friction restrained sliding movement of the support body on the mounting surface to other positions so that the repositioned specular element may redirect the laser beam to other points on the target area. The module may be used independently or in conjunction with a housing. The module includes alignment mechanisms adapted to cooperate with housing elements, align the module within the housing during assembly and maintain the centricity of the mirror during use.

35 Claims, 2 Drawing Sheets

LASER MANIPULATOR

TECHNICAL FIELD

The present invention relates to a device for directionally controlling the transmission of light energy, and more particularly for directionally controlling the transmission of a laser beam or the like for the purpose of performing delicate surgical operations. However, it also is readily adaptable for industrial or commercial applications.

BACKGROUND OF THE INVENTION

Devices for directionally controlling the transmission of a laser beam have been adapted for medical procedures. Lasers offer the advantages of high power and narrow spectral widths for producing small focused spot sizes on the target. Furthermore, target tissues readily absorb the laser energy.

The Argon laser (blue-green) has been extensively used in ophthamology because it provides good transmission characteristics in the ocular media as well as good absorption by target tissues in the retina and choroid. However, the carbon dioxide ($CO_2$) laser is highly absorbed by all tissues in the body and therefore offers the most extensive range of applications in medicine. A lens may be used to focus or defocus the laser beam depending on the application, such as photocoagulation of vessels and arteries, cutting, or vaporization of almost any body tissue including tumors and other abnormal tissues. The $CO_2$ laser has been applied in a number of medical disciplines including otolaryngology, gynecology, neurology, dermatology and in plastic and general surgery.

Heretofore, devices for realigning or manipulating a laser beam for medical or commercial applications may include one or more mirrors for redirecting or controlling the transmission path of the laser beam, while in other applications it may be necessary to manipulate the beam throughout its use in the procedure. For example, in lapraroscopy or bronchoscopy, it may be necessary to realign the laser beam to align or center the beam with an endoscope for proper entry therein. Laser beam realignment may be especially necessary when the beam is reflected from a number of mirrors in the transmission path. In contrast, it may be necessary to manipulate the laser beam during use to perform, for example, tumor evaporation or medical or commercial cutting procedures.

The last mirror or only mirror in the transmission path may be adjustably mounted in a fixture for adjusting the mirror position to direct or redirect the laser beam to the target site. When precision adjustment is desired, a joy stick may be linked with the above-mentioned mirror. Furthermore, the realigning or manipulating mirror may be positioned within a housing which also may include one or more lenses for focusing or defocusing the beam. An adapter may also be provided on the housing to connect the housing, for example, to an endoscope.

After continued use wherein the mirror receives a concentrated beam of energy in the form of a laser beam, the mirror becomes stained or discolored. Consequently, the hot mirror should be cleaned or more appropriately replaced. Unfortunately, prior art laser manipulators include complex mechanisms, such as gimbal assemblies, for fixedly positioning the adjustable mirror in a housing. These complex linkages operatively associate the mirror and the housing to form a mechanism therebetween for manipulating the mirror. Consequently, it is difficult to disassemble these complex linkages when it is necessary to remove the mirror assembly for cleaning or replacement thereof. Furthermore, these complex linkages are no less difficult to assemble during manufacture.

SUMMARY OF THE INVENTION

In view of the above and other deficiencies of the known prior art, it is the object of the present invention to provide a laser manipulator mirror module which may be readily removed from a laser manipulator housing for cleaning or replacing the mirror.

It is another object of the present invention to provide a laser manipulator mirror module which is simple in construction so that it may be easily assembled and thereby improve manufacturing cost efficiencies.

It is yet another object of the present invention to provide a laser manipulator mirror module which includes an alignment and centering mechanism for readily aligning and centering the module within a laser manipulator housing to improve mirror to housing assembly efficiencies.

It is still another object of the present invention to provide a laser manipulator housing and mirror module combination having cooperating alignment mechanisms and relative position indicia therefor to improve assembly efficiencies.

It is a further object of the present invention to provide a laser manipulator mirror module which includes a mirror adjustment linkage independent from the housing so that the module may be used with or without a housing.

It is yet a further object of the present invention to provide a removable laser manipulator mirror module having more than one mechanism for receiving a joy stick to improve interchangeability between module use with a housing and independent module use.

It is still a further object of the present invention to provide a removable mirror module which includes a continuously loaded mirror mounting mechanism for providing more precise alignment of the mirror and maintaining the mirror in its adjusted position.

Thus, the invention involves an apparatus for directionally controlling transmission of a laser beam or the like to a target area. The apparatus includes a support body, which supports a specular element suitable for reflecting a laser beam, and a tubular receiving member having a mounting surface for receiving the support body. A mounting mechanism is disposed within the tubular receiving member for releasably coupling the support body to the tubular receiving member and frictionally maintaining the support body seated against the mounting surface in a first position, while permitting friction restrained sliding movement of the support body on the mounting surface to other positions so that the repositioned specular element may redirect a laser beam to other points on the target area.

Other important features and advantages of the invention will be apparent from the following description and the accompanying drawings, wherein for purposes of illustration only, a specific form of the invention is shown in detail.

DETAILED DESCRIPTION OF THE PREFERRED EMBODIMENTS

Figure 1:
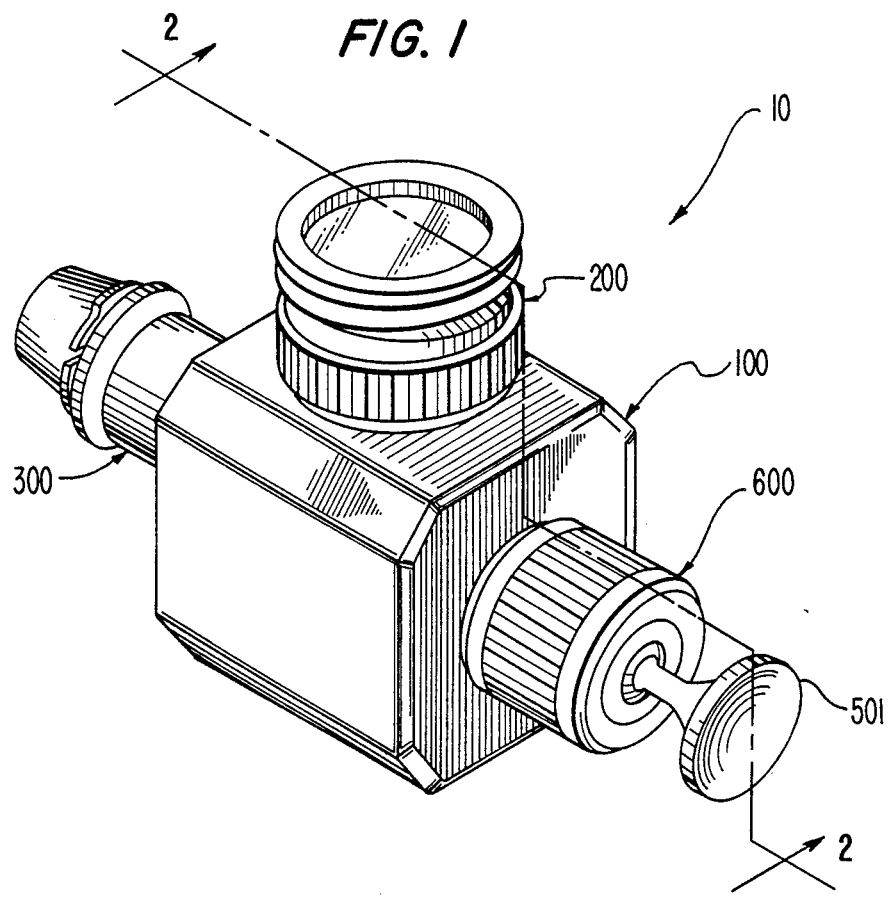
FIG. 1 is a perspective view of the laser beam manipulator in accordance with a preferred embodiment of the present invention.

Referring to the drawings in detail, wherein like numerals indicate like elements, FIG. 1 shows a laser beam manipulator 10 in accordance with a preferred embodiment of the invention. Laser beam manipulator 10 comprises housing 100 having lens assembly 200 and Karl Storz connector 300 releasably secured thereto. Tensioning and locking assembly 600, also releasably secured to housing 100, provides a mechanism for tensing or loosening mirror supporting hemisphere 410 in socket 424 so that mirror 411 may be locked in an adjusted position or loosened for manipulation, for example, by thumb-shaped handle 501, to another position (FIG. 2).

Figure 2:
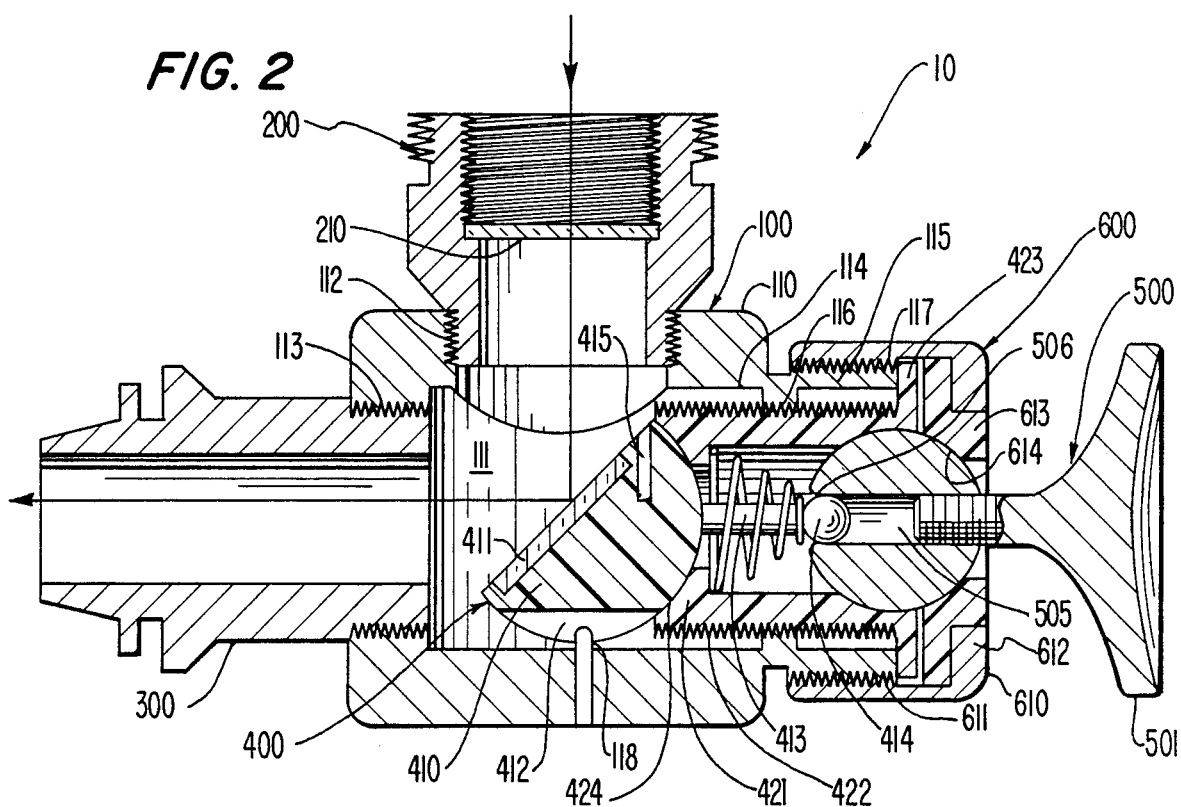
FIG. 2 is a cross-sectional view of the laser beam manipulator taken along lines 2—2 of FIG. 1.

Referring to FIG. 2, housing 100 comprises body portion 110 having first, second and third ports 112, 113 and 114 about mirror chamber 111 where mirror supporting hemisphere 410 and its mirror 411 are disposed. Housing body portion 110 may be threaded about first port 112 to threadably seat lens assembly 200. The threaded connection permits adjustment of lens 210 to a proper position so that lens 210 may appropriately focus or defocus a beam of light, or more specifically, a laser beam, upon mirror 411. The position and characteristics of lens 210 are selected according to the application. Housing body portion 110 also may be threaded about second port 113 to threadably receive a mechanism, such as bayonet-type Karl Storz connector 300, for operatively connecting the laser manipulator to a surgical device, such as an endoscope. Connector 300 also may be used to connect the laser manipulator to an operating laproscope to perform $CO_2$ laser laprosopy, single puncture procedure. Third port 114 receives mirror module 400 including mirror 411. Accordingly, a laser beam, depicted by the arrow in FIG. 2, enters through lens assembly 200 and first port 112, and exits from chamber 111 through second port 113 upon reflection from mirror 411.

Cylindrical portion 115 forms third port 114. Cylindrical portion 115 includes threads 116 about an inner surface thereof for threadably receiving tubular casing 421 of mirror module 400. Cylindrical portion 115 also includes threads 117 about an outer surface thereof for threadably receiving tensioning and locking assembly 600. Throughout the specification, threaded type releasable securing mechanisms are shown merely for purposes of example as other releasable securing mechanisms may be substituted therefor without departing from the scope of the invention.

Figure 3:
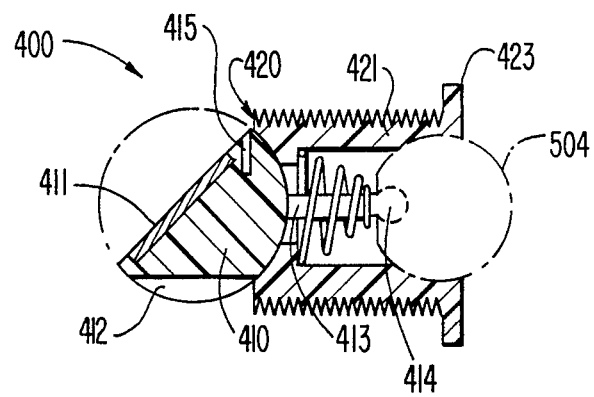
FIG. 3 is a cross-sectional view of the mirror module which manipulates the laser beam direction.
Figure 4:
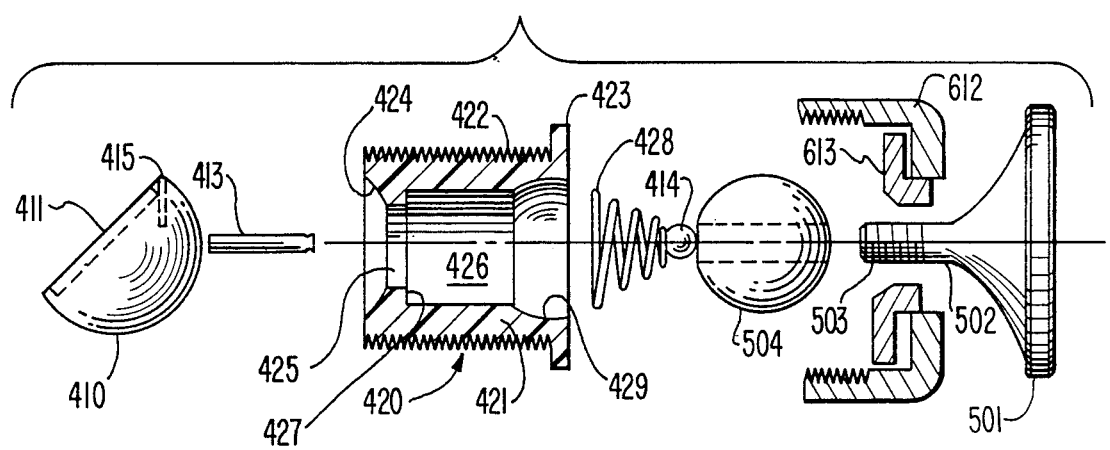
FIG. 4 is an exploded side view of the mirror module of FIG. 3 further illustrating a handle and tensioning assembly therefor, wherein the casing for the mirror module and the tensioning assembly are shown in cross-section.

Referring to FIGS. 2-4, mirror module 400 is removably disposed in housing 100 and includes mirror support body 410, which may be in the form of a hemisphere, support body receiving member 420, and a mounting or coupling mechanism, disposed within said receiving member 420, for frictionally maintaining or seating support body 410 in a first position against mounting surface or socket 424 of support body receiving member 420. The mounting mechanism further permits friction restrained sliding movement of mirror support body 410 on the mounting surface to other positions so that the laser beam which reflects from specular element 411 may be redirected.

Mirror support body 410 preferably is in the form of a hemisphere. The hemispherical shape provides body 410 with different surface configurations suitable for different functions. The spherical portion is suitable for forming a ball joint with the spherical mounting surface of receiving member socket 424, while the planar portion is suitable for supporting or forming a reflective surface. It should be understood that support body 410 may have other configurations such as one comprising a spherical portion for mating with socket 424, and any suitably shaped support surface for supporting a planar specular element. Specular element or mirror 411 may be embedded in a recess formed in support body 410 as shown in the drawings. Alternatively, support body 410 may be manufactured without a recess, wherein a specular element may be affixed or bonded to a surface thereof. Furthermore, when hemispherical support body 410 is metallic, the planar surface thereof may be polished to form a planar speculum.

Referring to FIGS. 2-4, the mechanism which couples support body 410 to support body receiving member 420 and provides a control for adjusting the position of mirror support body 410 relative to member 420 will be described. Extension arm 413 has one end affixed to the spherical portion of support body 410 and its other end affixed to spherical or substantially spherical retaining ball 414. Mirror 411 preferably forms a 45° angle with extension arm 413 as shown in the drawings. However, mirror 411 may be positioned relative to arm 413 at angles other than 45°.

At least one end of extension arm 413 is releasably secured to its respective mating element. However, both ends of arm 413 preferably are releasably secured to their respective mating elements. For example, both ends of extension arm 413 may be threaded so that one end of arm 413 may be threadably received in a threaded bore (not shown) formed in support body 410, and the other end of arm 413 may be threadably received in a threaded bore (not shown) formed in spherical retaining ball 414. The importance of the releasable connection is discussed below.

Receiving member 420 receives mirror support body 410 and comprises tubular casing 421 which may be cylindrical. Casing 421 preferably is made from Delrin ® or Teflon ® and includes threads 422 formed on the outer surface thereof for cooperation with threads 116 within cylindrical portion 115 of housing body portion 110. The Delrin ® or Teflon ® material reduces friction between the threads. The threaded arrangement permits casing 421 to be securely fitted into housing body portion 110 during assembly, and to be readily removed therefrom when, for example, it is desirable to replace or clean various component parts of laser manipulator 10, such as specular element 411. Flange 423 provides a stop mechanism which limits the penetration of casing 421 into housing cylindrical portion 115 during assembly. Obviously, other releasable securing mechanisms may be substituted for threads 116 and 422.

Casing 421 also includes sockets 424 and 429 at each end thereof for seating the spherical portions of mirror support body 410 and swivel ball 504, respectively, and permitting sliding engagement therebetween. Accordingly, each socket has a spherical surface dimensioned to mate with a respective one of the above-mentioned spherical portions and form a ball joint therebetween.

Casing 421 further comprises aperture 425 between socket 424 and chamber 426 for permitting extension arm 413 to pass therethrough and into chamber 426. Annular spring seating surface 427 is disposed adjacent to aperture 425 opposite mirror support body receiving socket 424. Annular spring seating surface 427 extends radially inwardly from the inner wall of casing 421 which forms chamber 426.

During assembly of mirror module 400, extension arm 413 is secured to support body 410 and then inserted through aperture 425 so that support body 410 seats in socket 424. Spring 428 then is placed around extension arm 413 in chamber 426 so that one end of the spring seats against annular surface 427. Alternatively, spring 428 may be seated in chamber 426 prior to the insertion of extension arm 413 therein. In either sequence, once spring 428 surrounds extension arm 413, spring retaining ball 414 is secured to the other end of extension arm 413. After retaining ball 414 is installed, spring 428 is compressed and continuously loaded between annular surface 427 and retaining ball 414 to continuously force mirror support body 410 to seat in socket 424. Accordingly, extension arm 413, spring 426, annular surface 427 and retaining ball 414, when in cooperation with support body 410 through receiving member socket 424, form a mounting mechanism for releasably coupling mirror support body 410 to support body receiving member 420 to form mirror module 400. This mounting arrangement also forms a mechanism for frictionally maintaining support body 410 seated in receiving member socket 424 in a first position, while permitting friction restrained sliding movement of the support body in the socket to other positions by manipulating ball 414 or extension arm 413, so that mirror 411 may be reoriented and the laser beam, reflected therefrom, redirected.

In the above description of the assembly of mirror module 400, extension arm 413 was initially secured to support body 410. However, extension arm 413 may be initially secured to retaining ball 414. Specifically, the mirror module assembly sequence may comprise securing retaining ball 414 to extension arm 413, placing spring 428 around arm 413 and inserting those assembled parts into chamber 426. Alternatively, spring 428 may be seated in chamber 426 prior to the insertion of extension arm 413 therein. In the final step, support body 410 may be secured to the free end of extension arm 413 adjacent to socket 424.

As can be understood from the above, the above-mentioned releasable securing mechanism between support body 410 and extension arm 413 and/or retaining ball 414 and extension arm 413 permits mirror support body 410 to be separated from support body receiving member 420. Once separated, component parts, such as mirror 411 or spring 428, may be independently cleaned, repaired or replaced.

Once assembled, mirror module 400 is ready to be mounted in laser manipulator housing 100. Referring to FIG. 2, threads 422 and 116 provide a mechanism for screwing mirror module 400 into cylindrical portion 115 of laser manipulator housing 100, while groove 412, bore 415 and centering pin 118 provide a mechanism for aligning mirror support body 410 within housing chamber 111. Specifically, centering pin 118, which extends from an inner wall of housing body portion 110 and into housing mirror chamber 111, cooperates with groove 412, which is formed on a peripheral surface of support body 410 and runs substantially parallel to the longitudinal axis of extension arm 413. The outermost portion of bore 415 and the end of groove 412, which is adjacent to the planar portion of mirror support body 410, are diametrically disposed. Therefore, bore 415 indicates the position of groove 412. More particularly, when looking through first port 112 to align pin 118 and groove 412 during assembly, bore 415 provides indicia of groove position.

Returning to the mounting of the mirror module into housing 100, mirror module 400 is threadably inserted into cylindrical portion 115. As support body 410 approaches a position adjacent to centering pin 118, spring retaining ball 414 may be manipulated to align groove 412 with centering pin 118 while referencing the position of bore 415. Then, ball 414 may be pressed to compress spring 428, further extend support body 410 into chamber 111 and slide groove 412 over centering pin 118. Once centering pin 118 mates with groove 412, tubular casing 421 again may be rotated. At this point, rotation of tubular casing 421 translates mirror support body 410 into its desired position within laser manipulator housing 100 due to the cooperation between pin 118 and groove 412. Accordingly, the groove and center pin combination forms an alignment mechanism, stops unwanted rotation of mirror support body 410 after the pin and groove engage so that support body 410 may be translated into its operative position, and guarantees centricity of mirror 411 within the housing.

It should be apparent that the previously described mounting mechanism comes into play when mounting the mirror module into housing 100. Specifically, it not only holds the mirror module together while providing control over the position of support body 410 during use, it further permits pure translating axial extension of support body 410 so that pin 118 and groove 412 may be easily aligned for assembly purposes. If support body 410 could not be translated as such, further rotation of module 400 would be required to bring support body 410 in the region of pin 118. However, such rotation could bring the non-grooved portion of support body 410 into contact with pin 118 which might result in undesirable deformation of pin 118.

After mirror module 400 is assembled in laser manipulator housing 100, the center pin and groove combination also prevents undesirable rotation of mirror 411 during use. More specifically, by moving retaining ball 414, one may rotate the mirror support body, and thus, mirror 411 about the X and Y axis to precisely manipulate the laser beam direction. Furthermore, it should be readily apparent that extension arm 413 may be made longer so that an operator could directly manipulate arm 413. Alternatively, an external thumb-shaped handle may be used to provide an indirect method for manipulating extension arm 413 and mirror 411 therewith.

Referring to FIGS. 2 and 4, a thumb shaped hand assembly is shown. Handle assembly 500 comprises thumb-shaped handle 501, handle arm 502 extending therefrom with threaded portion 503 at an end thereof for securing the same to a threaded portion of aperture 505 which extends through swivel ball 504. Aperture 505 includes enlarged portion 506 where retaining ball 414 is received (see FIG. 2). Enlarged portion 506 may be formed by beveling swivel ball 504 in an end region of aperture 505. After swivel ball 504 is seated in socket 429 of mirror module 400 and retaining ball 414 is disposed in aperture 505, enlarged portion 506 permits relative movement between swivel ball 504 and extension arm 413 without interference therebetween. Therefore, enlarged portion 506 provides extension arm 413 with more freedom of movement.

Tension or locking assembly 600 locks swivel ball 504 and therefore mirror 411 in an adjusted position, while permitting swivel ball 504 and mirror 411 to be manipulated to other positions when assembly 600 is loosened. Referring particularly to FIG. 2, adjustable tension nut assembly 600 comprises cap or tensioning nut 610 having threads 611 therein for threadably receiving threads 117 formed on housing cylindrical portion 115. Cap 610 also includes annular flange 612 for supporting locking ring 613. Locking ring 613 is configured to conform with the contours of annular flange 612 and swivel ball 504. Accordingly, locking ring 613 includes spherical bevel or socket 614 which forms a gripping surface to grip and lock swivel ball 504 when assembly 600 is tightened, i.e., when cap or nut 601 is rotated to move locking ring 613 toward swivel ball 504. Rotation of cap 610 in the other direction moves locking ring 613 away from swivel ball 504, thereby loosening locking assembly 600, so that swivel ball 504 and mirror 411 may be readjusted by handle 501. Accordingly, locking ring 613 is made preferably from Delrin ® or Teflon ®.

Mirror module 400 may be used independently of laser manipulator housing 100. For example, module 400 may be placed in an open fixture. Furthermore, more than one mirror module may be used to direct a laser beam to a desired target. The concept of redirecting a laser beam more than once is especially advantageous in industrial applications. For this purpose, a number of modules 400 may be supported in separate fixtures or a single fixture having a support mechanism for each module.

Figure 5:
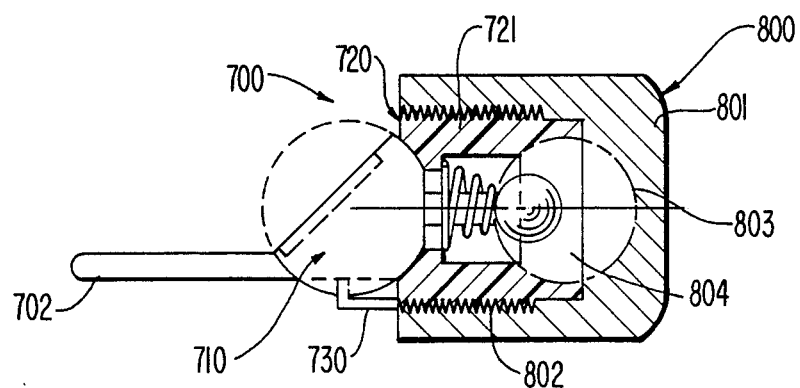
FIG. 5 is a partial cross-sectional view of the laser beam manipulator in accordance with a further embodiment of the invention.

Referring to FIG. 5, independent mirror module 700, which essentially differs from module 400 in handle design, is especially suitable for use without a housing such as laser manipulator housing 100. Independent mirror module 700 includes mirror support body 710 which has manipulating handle 702 directly affixed thereto. Otherwise, mirror support bodies 410 and 710 are identical as are the mounting and coupling mechanisms of mirror modules 400 and 700.

Alternatively, mirror module 700 may include mirror support body 410 in lieu of mirror support body 710. In this instance, a joy stick may be releasably received in bore 415, for example, by a threaded connection therebetween. Specifically, a joy stick may be inserted into bore 415 to adjust the position of the mirror support body when the mirror module is not used in conjunction with laser manipulator housing 100. Such a joy stick eliminates the need for handle 702. Furthermore, the joy stick may be removed from bore 415 so that the mirror module may be inserted into laser manipulator housing 100. In the resultant module housing assembly, extension arm 413 or retaining ball 414 may be manipulated to adjust the position of mirror support body 410.

Therefore, bore 415 not only provides indicia for alignment, as previously described, it facilitates interchangeability between dependent and independent use.

Referring to FIG. 5, mirror support body receiving member 720 includes tubular casing 721. As shown in FIG. 5, casing 721 may be formed without a flange corresponding to flange 423 on casing 421 so that casing 721 and receiving member 720 may be received in optional tensioning or locking assembly 800. Support body receiving member 720 also includes centering pin 730 which extends from tubular casing 721 for engagement with a groove in support body 710 similar to groove 412 in module 400. As shown in FIG. 5, pin 730 may be bent so as to penetrate the groove in a direction substantially normal to the longitudinal axis of the groove and thus interact with the groove walls to prevent undesirable rotation of mirror support body 710. Alternatively, a resilient centering pin may extend from tension nut 801 of tension assembly 800. In all other respects mirror support body receiving members 420 and 720 are the same.

Tension or locking assembly 800, as illustrated in FIG. 5, includes tension nut 801, threads 802 to threadably receive externally threaded tubular casing 721, and socket 803 which forms a spherical gripping surface for spherical swivel ball 804. Swivel ball 804 is similar to swivel ball 504 and therefore includes an aperture, including an enlarged mouth portion, for receiving a retaining ball such as retaining ball 414. The operation of locking assemblies 600 and 800 is the same.

Obviously, the materials used in making the apparatus may be selected from a wide variety of materials and the dimensions may vary according to intended use. Merely to exemplify a preferred makeup of size and material selection, the following may be recited. Housing 100 is sized to be less than two cubic inches and is made from aluminum or stainless steel. Mirror support receiving member 420 and locking ring 613 are made from Teflon ® or Delrin ®. Support body 410, extension arm 413, retaining ball 414 and swivel ball 415 are made from brass.

Having described the invention in detail, it will be recognized that the foregoing is considered as illustrative only of the principles of the invention. Since numerous modifications and changes will readily occur to those skilled in the art, it is not desired to limit the invention to the exact construction, materials, assembly and so forth shown and described. Accordingly, all suitable modifications and equivalents may be resorted to the extent they fall within the scope of the invention and claims appended hereto.

I claim:

1. An apparatus for directionally controlling transmission of a laser beam or the like to a target area comprising:

a support body supporting a specular element suitable for reflecting a laser beam;

a receiving member having an exterior tubular shape including a mounting surface formed at one end of the tubular receiving member for receiving said support body; and mounting means disposed within said tubular receiving member for releasably coupling said support body to said tubular receiving member and frictionally maintaining said support body seated against said mounting surface in a first position, while permitting friction restrained sliding movement of said support body on said mounting surface to other positions so that said specular element, once repositioned, may redirect the laser beam to other points on the target area.

2. The apparatus according to claim 1 wherein said support body includes a groove adapted to cooperate with a centering pin for preventing support body rotation about a predetermined axis, said groove being formed in the peripheral surface of said support body.

3. The apparatus according to claim 2 wherein said support body is substantially hemispherically shaped and said groove is formed in the spherical surface thereof, said support body further includes indicia means substantially diametrically disposed from one end of said groove for indicating groove position.

4. The apparatus according to claim 3 wherein said indicia means comprises an outer portion of a bore formed in said support body.

5. The apparatus according to claim 1 wherein said support body includes a bore adjacent to the perimeter of said specular element for receiving a joy stick to manipulate the position of said support body relative to said receiving member.

6. The apparatus according to claim 1 wherein said specular element is mounted on said support body.

7. The apparatus according to claim 6 wherein said specular element is embedded in said support body.

8. The apparatus according to claim 7 wherein said support body is substantially hemispherically shaped and said specular element is positioned in the planar region thereof.

9. The apparatus according to claim 1 wherein said receiving member comprises a casing including securing means adapted to releasably secure said receiving member within another member.

10. The apparatus according to claim 1 wherein said receiving member comprises a casing having threads on the outer surface thereof adapted to releasably secure said receiving member within another member.

11. The apparatus according to claim 1 wherein said receiving member includes a flange on the outer surface of one end thereof.

12. The apparatus according to claim 1 wherein said receiving member comprises an aperture having one end opening into said mounting surface and another end opening into a spring seating surface which extends radially inwardly from an inner wall of said tubular receiving member.

13. The apparatus according to claim 1 further including a handle secured to said support body adjacent to the perimeter of said specular element.

14. The apparatus according to claim 1 wherein said mounting means comprises an extension arm, a retaining element and a spring positioned about said extension arm, said extension arm having one end secured to said support body and another end secured to said retaining element.

15. The apparatus according to claim 14 wherein said receiving member comprises an aperture having one end opening into said mounting surface and another end opening into a spring seating surface which extends radially inwardly from an inner wall of said tubular receiving member, said spring having one end seated against said spring seating surface and spaced from said support body, the other end of said spring abutting said retaining element wherein the distance between said retaining element and said spring seating surface is selected to place said spring under compression and continuously force said support body against said mounting surface.

16. The apparatus according to claim 14 wherein said extension arm is releasably secured to said support body.

17. The apparatus according to claim 16 wherein said extension arm is releasably secured to said retaining element.

18. The apparatus according to claim 14 wherein said receiving member further comprises a socket with an opening therethrough, said socket and said mounting surface being at opposite ends of said receiving member, a substantially spherical swivel element being seated in said socket, and said retaining element being disposed in an aperture formed in said swivel element.

19. The apparatus according to claim 18 further including tensioning means for locking said swivel element in one position, while permitting said swivel element to be manipulated to other positions when said tension means is loosened.

20. The apparatus according to claim 19 further comprising a handle secured to said swivel ball for manipulating said swivel ball in said socket.

21. The apparatus according to claim 19 further comprising a handle secured to said support body adjacent to the perimeter of said specular element.

22. The apparatus according to claim 1 wherein said support body includes a groove formed in the peripheral surface thereof and said receiving member includes a pin extending therefrom, a portion of said pin being substantially normal to the longitudinal axis of said groove and being disposed therein.

23. The apparatus according to claim 1 further comprising a housing forming a chamber, said housing including a port in communication with said chamber and a pin extending from an inner wall of said housing and into said chamber, said support body including a groove formed in the peripheral surface thereof, wherein said receiving member is positioned in said port so that said pin extends into said groove.

24. The apparatus according to claim 23 wherein said receiving member includes threads on the outer surface thereof which cooperate with threads formed in said housing about said port.

25. An apparatus for directionally controlling transmission of a laser beam or the like to a target area comprising:
   a mirror support body being substantially hemispherically shaped, said mirror being positioned within the planar region of said substantially hemispherical support body, and a groove formed in the spherical surface of said support body, said groove being adapted to cooperate with a centering pin for preventing support body rotation about a predetermined axis;
   a tubular receiving member comprising a mounting surface for receiving said substantially hemispherical support body and adapted to form a ball joint therewith, said tubular receiving member further including securing means formed on the outer surface thereof adapted to releasably secure said receiving member within another member; and
   mounting means disposed within said tubular receiving member for releasably coupling said support body to said tubular receiving member and frictionally maintaining said support body seated against said mounting surface in a first position, while permitting friction restrained sliding movement of said support body on said mounting surface to other positions so that said mirror, once repositioned, may redirect the laser beam to other points on the target area.

26. A housing for supporting a mirror comprising:
a first port for receiving a beam of light;
a second port for emitting said beam of light;
a third port; and
a pin extending from an inner wall of said housing, said pin adapted to cooperate with a groove in a mirror support body when inserted into said third port.

27. The housing according to claim 26 wherein threads are formed in said housing about said third port, said threads adapted to cooperate with a threaded mirror module when inserted into said third port.

28. An apparatus for directionally controlling transmission of a laser beam or the like to a target area comprising:
a housing including at least one port and a pin extending from an inner wall of said housing; and
a mirror module comprising a grooved support body which supports a specular element, a receiving member having an exterior tubular shape and including a mounting surface formed at one end of the tubular receiving member for receiving said support body and mounting means for releasably coupling said support body to said receiving member; wherein said mirror module is positioned in said at least one port so that said pin extends into the groove of said grooved support body.

29. The apparatus according to claim 28 further comprising releasable securing means formed in said housing about said at least one port and on the outer surface of said mirror module for releasably securing said mirror module in said housing.

30. The apparatus according to claim 29 wherein said releasable securing means comprises threads formed in said housing about said at least one port and threads formed on an outer surface of said mirror module.

31. The apparatus according to any one of claims 28, 29 or 30 wherein said mounting means frictionally maintains said support body seated against said mounting surface in a first position, while permitting friction restrained sliding movement of said support body on said mounting surface to other positions so that said specular element, once repositioned, may redirect the laser beam to other points on the target.

32. A method for assembling a mirror module and a housing therefor comprising the steps of:
coupling a grooved support body including a specular element supported thereon to a mounting surface of a receiving member to form a mirror module;
inserting said mirror module into a port formed in a housing;
aligning the groove of said grooved support body with a pin extending from an inner wall of said housing; and
extending said support body over said pin so that said groove slides over said pin.

33. The method according to claim 32 wherein threads are formed in said housing about said port and on the outer surface of said module, said inserting step includes rotating said mirror module to threadably insert said module into said port.

34. The method according to claim 32 wherein said aligning step includes ascertaining the position of said groove according to indicia provided on said support body.

35. The method according to claim 32 wherein threads are formed in said housing about said port and on the outer surface of said receiving member, said extending step includes rotating said receiving member after said pin and said groove cooperate to extend said mirror support body into a chamber formed by said housing.

* * * * *